July 6, 1954 C. W. EARP 2,683,213

RADIO DIVERSITY RECEIVING SYSTEM

Filed Feb. 8, 1951 2 Sheets-Sheet 1

Inventor
CHARLES W. EARP
By Percy P. Lantzy
Attorney

July 6, 1954 C. W. EARP 2,683,213

RADIO DIVERSITY RECEIVING SYSTEM

Filed Feb. 8, 1951 2 Sheets-Sheet 2

Inventor
CHARLES W. EARP
By Percy P. Lantzy
Attorney

Patented July 6, 1954

2,683,213

UNITED STATES PATENT OFFICE 2,683,213

RADIO DIVERSITY RECEIVING SYSTEM

Charles William Earp, London, England, assignor to International Standard Electric Corporation, New York, N. Y., a corporation of Delaware Application February 8, 1951, Serial No. 210,077

Claims priority, application Great Britain February 14, 1950

4 Claims. (Cl. 250—20)

Figure 1:
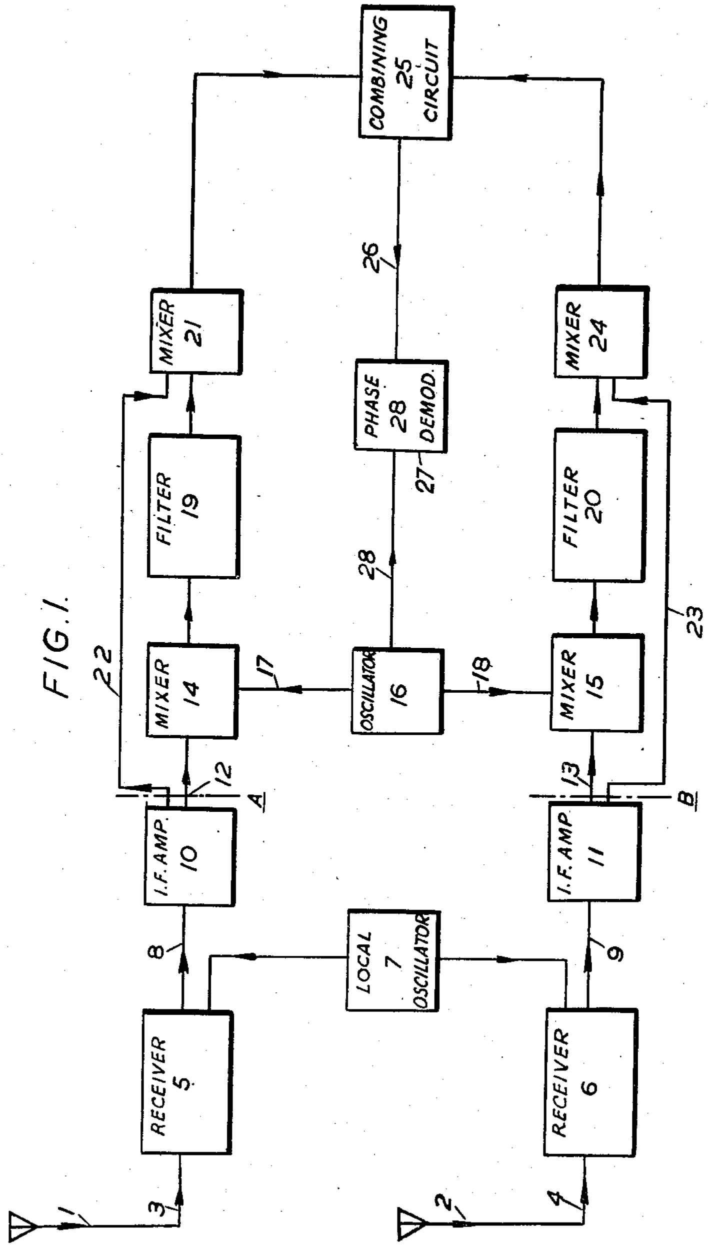

This invention relates to radio diversity receiving systems.

More particularly, it relates to space-diversity radio reception of angularly modulated carrier waves, such as for example, frequency or phase modulated carrier waves.

Space-diversity reception of amplitude modulated waves is well-known and this method of reception has been applied with success to short wave telephone and broadcast transmissions. In space-diversity receiving systems in general, two or more separate aerials are spaced far enough apart at the receiving station, to yield signals having different fading characteristics. Each said aerial is then associated with a corresponding receiver or receiving channel to provide its respective signal channel. Automatic gain control voltages may be combined and used to control the gain of all said receivers or receiving channels equally and the output from the detector stage in each said receiver or receiving channel is fed into a common circuit to be combined therein. This common circuit thus provides a single combined final output or a single combined low frequency output (or channel).

In receiving frequency or like angularly modulated waves (or signals), it is desirable and usual in practice, to apply limitation to the signal amplitude prior to the detector stage. If said amplitude limitation is imposed on each of the receivers or receiving channels in a space-diversity receiving system for said angularly modulated waves, it is possible for a single channel, having a weak signal compared to the noise therein, to contribute a substantially large noise voltage to the combined low frequency output. In other words, any limitation of the strongest channel or channels tends to exaggerate the effect of the noise from the remaining channel or channels, and various devices and arrangements have been suggested to ensure more effective diversity reception of frequency modulated (FM) waves. Some of these suggestions while providing effective results under certain special conditions, tend to call for complicated design and operation but other such suggestions fail to provide, in practice, any very desirable results.

For example, a moderately effective though somewhat complicated system for diversity reception of frequency-shift telegraph signals, comprises a common frequency changing oscillator means to derive outputs (or channels) at the same intermediate frequency (I. F.) in each of three receivers. Two of these three I. F. outputs are then arranged to be modified by displacement in frequency by means of further frequency changing and filtering. The two I. F. outputs, so modified, are then combined with the remaining unmodified I. F. channel in a common limiter circuit. The limiter circuit exaggerates the differences in level between the three outputs so obtained. Three filters are used following the said limiter circuit to select and separate the three channels from each other. Each of the channels, so separated, is then further heterodyned to an identical frequency and fed into its respective discriminator. All three discriminators in this case are identical and they operate into a common output load circuit to provide a combined low frequency output (or channel).

Such a system, though found satisfactory for the diversity reception of short-wave frequency-shift telegraph signals, is complicated in design as already stated. Furthermore, in the case of signals where the frequency bandwidth in operation is comparatively large, such as for example, in FM radio links or the like systems, a plurality of oscillators as called for in the system outlined above, will tend to produce spurious beat frequencies thus endangering the efficiency of the system.

It is the primary object of the present invention to provide an essentially simple space-diversity receiving system. A further object is to provide such a system which will be satisfactory for all types of angularly modulated transmissions. According to one aspect of the present invention there is provided a radio space-diversity receiving system for the reception of waves angularly modulated by signals comprising a plurality of receiving antennae each coupled to a separate receiving channel comprising means for producing in each of said channels angularly modulated carrier waves the mean frequency of all said modulated carrier waves being identical and the instantaneous phases of said modulated carrier waves being substantially the same, and means for combining said modulated carrier waves in a common circuit for detection.

It will be seen that the invention enables the waves in all the channels to be directly combined.

The production of the waves to be directly combined may be carried out by converting any frequency modulation of the incoming waves into a phase modulation of a carrier and according to a further aspect the present invention provides a radio space-diversity receiving system for the reception of waves angularly modulated by signals comprising a plurality of receiving antennae each coupled to a respective receiving channel, means for translating the waves in the respective receiving channels into corresponding cophasal carriers of a mean frequency the same for all the channels phase modulated by the said signals and means for combining said modulated carrier waves in a common circuit for detection.

Figure 2:
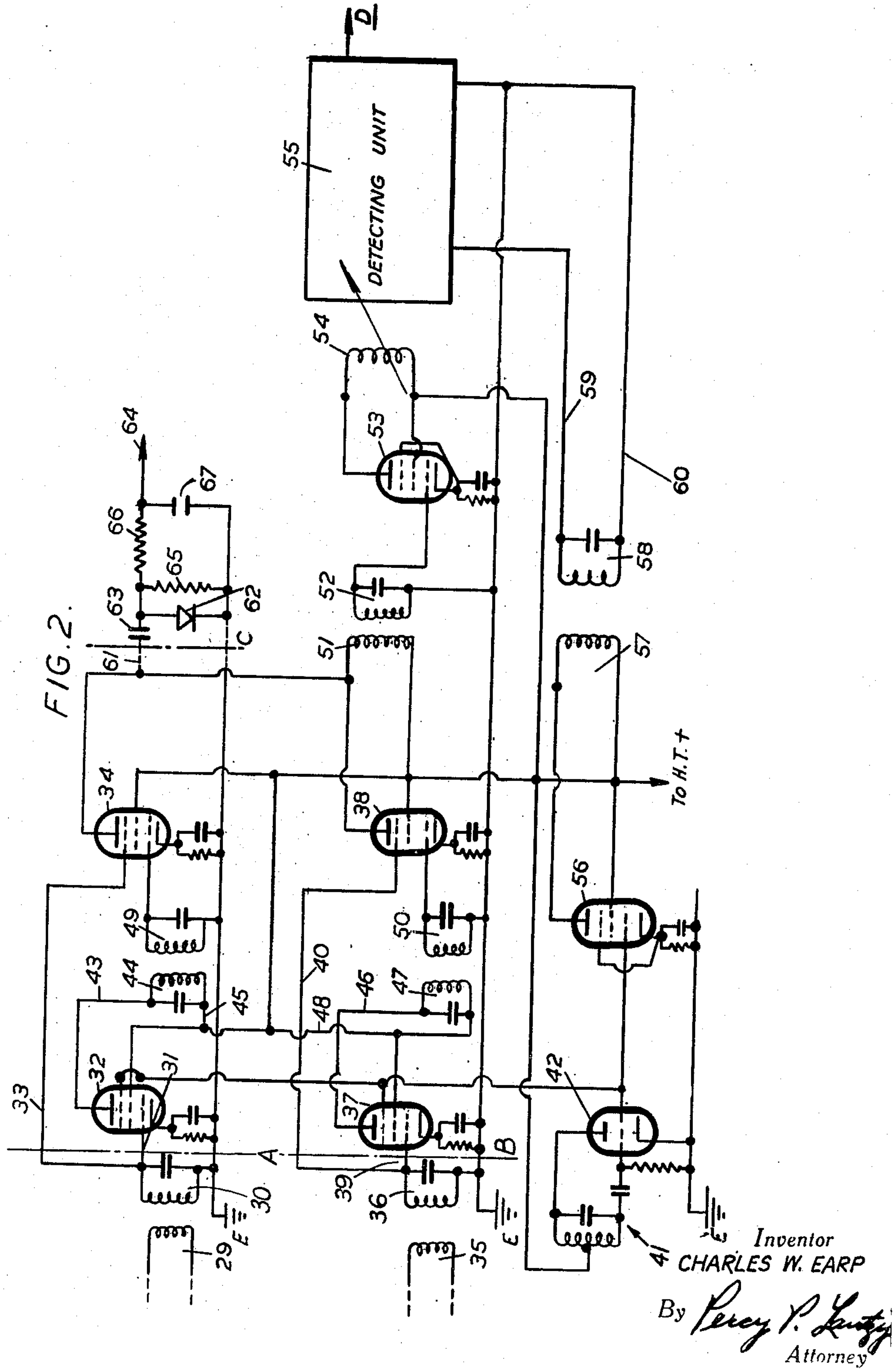

The above-mentioned and other features and object of this invention and the manner of attaining them will become more apparent and the invention itself will be best understood, by reference to the following description of an embodiment of the invention taken in conjunction with the accompanying drawings, wherein:

Fig. 1 is a block diagram of one embodiment of a complete receiving system according to the present invention, and Fig. 2 is a schematic and block diagram in greater detail of some relevant parts of the embodiment as shown in Fig. 1.

In the embodiment according to the present invention to be described hereinafter, use is made of a system employing two antennae, only by way of an example and to avoid complications in the description.

Referring now to Fig. 1, 1 and 2 represent two antennae arrangements coupled via respective lines 3 and 4 to the receivers 5 and 6 respectively. The said receivers thus represent the sources of two signal waves of identical carrier frequency but having different fading characteristics as already stated above. A local oscillator 7 is coupled to both said receivers 5 and 6. From the respective mixer circuits in said receivers, the respective I. F. outputs are coupled via lines 8 and 9 to the two I. F. amplifiers 10 and 11 respectively. Part of the outputs from 10 and 11 are fed via lines 12 and 13 to further respective frequency changers or mixers 14 and 15. It is clear that the said outputs from 10 and 11 will be at the same frequency $f$, where $f$ represents the unmodulated or center frequency. A common oscillator (preferably of a stable frequency) 16 operating at a frequency F (say), is coupled to said mixers 14 and 15 via lines 17 and 18 respectively. The outputs from the said mixers 14 and 15 are fed into filters 19 and 20 respectively. The filters 19 and 20 are similar in form and characteristics, and each of them may be of the band-pass type comprising, for example, two coupled tuned circuits. Moreover each said filter is tuned to the same beat frequency between said frequencies $f$ and F, for example $(F-f)$ or $(F+f)$ in each case, and inherently imposes a small but substantially similar delay or phase shift on the signals selected. The output from the filter 19 is fed into a further frequency changer or mixer 21, and part of the I. F. output from 10 is also fed directly via line 22 to said frequency changer 21. Similarly the output from filter 20 and part of the I. F. output from 11 via line 23 are fed into the further frequency changer or mixer 24. The output from each of said frequency changers 21 and 24 has a mean frequency F which, as already stated above, is also the frequency of the output from said common oscillator 16. The outputs from 21 and that from 24 will not only have the same frequency, as F in this case, but will also be substantially cophasal always, though the signals arriving at the respective inputs to said receivers 5 and 6 may have any random phase relation thereinbetween.

The following is one possible theory or explanation of how this effect is produced. Assuming first the simplest case where the incoming signal on both antennas is for a given instant unmodulated either in frequency of phase, and that due to the disposition of the antennas with respect to the transmitter the signal received on antenna 2 has a phase $\sphericalangle\alpha$ with respect to the signal received on antenna 1. This phase difference will carry through both intermediate frequency amplifiers 10 and 11, and the output of amplifier 10 will be $f+\sphericalangle 0°$ ($\sphericalangle 0°$ indicating that this is the reference phase) while the output of amplifier 11 will be $f+\sphericalangle\alpha$.

Tracing the signal $f+\sphericalangle 0°$ received from amplifier 10, in mixer 14 it will be combined with frequency F from oscillator 16 to become $$F-(f+\sphericalangle 0°)$$

at the output of filter 19, plus the additional phase shift produced in the filter. Where the frequency (or phase) of the signal is not changing this additional phase shift will be substantially 90°. Thus the output of filter 19 will be $F-(f+\sphericalangle 0°)+\sphericalangle 90°$. In mixer 21 this output will be combined with the output of amplifier 10, $f+\sphericalangle 0°$ to produce an output $F+\sphericalangle 90°$.

Tracing the signal $f+\sphericalangle\alpha$ from the output of amplifier 11, at the output of mixer 15 it will be combined with frequency F, and at the output of filter 20 there will appear (again in the absence of modulation) $F-(f+\sphericalangle\alpha)+\sphericalangle 90°$ which when mixed in mixer 24 with the direct signal from amplifier 11, $f+\sphericalangle\alpha$ will produce an output $F+\sphericalangle 90°$. This output from mixer 24 is therefore cophasal with that from mixer 21 and is of course the same frequency.

Assume next that frequency modulation is added to the same signal. At the output of amplifiers 10 and 11 we have respectively $$f+\Delta f+\sphericalangle 0°$$

and $$f+\Delta f+\sphericalangle\alpha$$

respectively where $\Delta f$ represents the frequency modulation. If the phase angles involved are ignored for a moment, it will be seen that at the output of filter 19 there appears $$F-(f+\Delta f)$$

which is combined in mixer 21 with $$f+\Delta f$$

to produce an output of F. Likewise the output of mixer 24 consists of F. However, due to the frequency modulation the filters 19 and 20 no longer shift the output of F by 90° but by a different angle depending upon the modulation, this different angle being the same for both filters. Assuming this angle is 85° at one instant, then the outputs of both mixer 21 and 24 will be $$F+\sphericalangle 85°$$

which phase angle will be detected in the phase demodulator 27. The frequency modulation of the original signals at aerials 1 and 2 has thus been translated into phase modulation at the respective output of said frequency changers 21 and 24.

Likewise in the case of phase modulation, the instantaneous change of phase is effectively equivalent to a change of frequency in that the filters 19 and 20 will shift the phase of energy passing therethrough by some angle differing from 90° by an amount depending on the amount of phase modulation. These outputs from mixers 24 and 25 being of the same frequency and substantially cophasal, can now be combined in a circuit 25 of any known form, without there being any cancellation of signals obtained from the two channels. The output from circuit 25 is then fed via line 26 to circuit 27 which may be any known form of phase demodulator or differential detector, part of the output of oscillator 16 being fed via line 28 into said circuit 27 to provide the reference frequency required for the operation of said demodulator or detector circuit.

Alternatively, the output from said circuit 25 can be demodulated or detected without reference to said oscillator 16. For this purpose the said output is fed into a frequency discriminator circuit of any known form (not shown); the output from said frequency discriminator representing, as is well known, the first time differential of the modulation envelope of the input signals unless it is subjected to suitable compensating network.

A particular example of a more detailed circuit arrangement for part of the system described with reference to Fig. 1 will now be described, by way of illustration, in conjunction with Fig. 2. The part, now under consideration, is principally that following points A and B in Fig. 1, and as will be seen, shows only those elements directly necessary to the illustration of the principles of the present invention, details such as for example power supply sources and connections thereto and the like being omitted wherever possible. The system as described above is one for converting frequency modulated incoming signals to phase modulated signals and has the added significant feature that if the signals at the output of said units 10 and 11 (Fig. 1) have the same frequency, the outputs from units 21 and 24 (Fig. 1) are not only also of identical frequency (as F in the above description) but they are cophasal as well. Thus it is possible to combine these said outputs always in phase in circuit 25 (Fig. 1). It is evident also that instead of only two signal sources as shown in Fig. 1 above, any number of separate signal sources may be used and the outputs from other units similar to units 21 and 24 (Fig. 1) may also be combined in phase in said circuit 25.

Referring now to Fig. 2, two signals at the same frequency, such as for example from units 10 and 11 respectively (Fig. 1) are introduced respectively at A and B. The A signal, at the output of unit 10 (Fig. 1) develops a voltage acros coil 29 which is coupled to a tuned circuit 30 tuned to the frequency of the signal. A connection 31 feeds part of the voltage developed across 30 to the control (or first) grid of a mixer valve 32, shown here as a pentode by way of an example only. An connection 33 feeds another part of the voltage developed across said circuit 30 directly to the suppressor (or third) grid of a further mixer valve 34 also shown here as a pentode. Similarly the B signal, at the output of unit 11 (Fig. 1) and at the same frequency as the A signal, is fed via coil 35 and tuned circuit 36 to the control grid of a mixer valve 37 and to the suppressor grid of a further mixer valve 38 via connections 39 and 40 respectively. The suppressor grid of each of the valves 32 and 37 is connected to a constant frequency oscillator 41, shown here as a triode valve 42 connected as a "Hartley" circuit, by way of an example only. The anode of the mixer valve 32 is connected to the high tension supply (H. T.+) via connections 43, a tuned circuit 44 and connections 45, while the anode of the mixer valve 37 is similarly connected to the high tension supply (H. T.+) via connections 46, a tuned circuit 47 and connection 48. The tuned circuits 44 and 47 are coupled to respective further tuned circuits 49 and 50 and said pair of tuned circuits 44, 49 and 47, 50 are tuned to operate as band-pass filters (referred to in Fig. 1 as 19 and 20 respectively), to enable selection of the same beat between the frequency of the oscillator 41 and that of the A or B signals, both said signals, as already stated, being at the same frequency. As mentioned above the beat frequency selected will be the same in each case. The voltages developed across the circuits 49 and 50 are fed into the respective control grids of the further mixer valves 34 and 38 as shown, and are combined or mixed therein respectively with the A and the B signal voltages directly fed into the respective suppressor grids of said valves via connections 33 and 40 as stated above. It is evident from the description that, the voltages reaching each of said control grids differ in frequency from those reaching its respective suppressor grid by the frequency of the oscillation generated by said oscillator 41. An output at this difference frequency, that is at the frequency of the oscillator 41 is selected in the coil 51 coupled to a tuned circuit 52. As the anodes of the valves 34 and 38 are commoned in parallel, the coil 51 is in fact the common output load and the anodes are connected to the high tension supply (H. T.+) through said coil. It is important to note at this stage, that so long as the signals A and B have identical frequency, relative phases thereinbetween have no sensible significance and signals at the oscillator frequency derived across coil 51 from valves 34 and 38 must have substantially the same phase and will thus additively combine therein. Also that if the tuned circuits are tuned exactly to the middle of the signal band and said middle frequency is being received then the voltages developed across coil 51 by said combination will be in exact phase quadrature with the voltages injected from the oscillator 42 into the suppressor grids of the valves 32 and 37. This phase difference of 90° is obtained from the similar phase shift between the input and the output of the pair of tuned circuits 44, 49 and between the input and the output of the pair of tuned circuits 47, 50, each said pair being similarly lightly coupled.

As over the pass-band of said filters, the phase shift varies over 90° about a mean, when the signals at A and at B are frequency modulated so that similar frequency modulation is caused in said filters over the entire pass-band thereof, the resulting voltages in the anode circuits of said mixer valves 34 and 38, that is in coil 51, will be phase modulated over ±90° about a mean phase which is in quadrature with that of the output from oscillator 41. The voltage, developed across the tuned circuit 52, coupled as stated to coil 51, is fed to the control grid of a valve 53 (shown as a pentode by way of example) arranged to operate as a limiter to remove therefrom any possible amplitude modulation present in the usual manner. The voltages as developed in the coil 54 in the anode circuit of said limiter valve 53 are then transferred by coupling as indicated by an arrow to the detecting unit 55. Unit 55 may comprise, for example, a differential detector or a phase discriminator arrangement of any known form, in which the said voltages may be compared, in the usual manner, with the voltage from the said oscillator 41 used as a reference voltage. For this purpose the output of the oscillator 41 is transferred via a buffer amplifier 56 to a coil 57 as shown. A tuned circuit 58 tuned to the frequency of said oscillator 41 is coupled to said coil 57 and the voltage at the frequency of the oscillator 41 is thus transferred via connections 59, 60 to unit 55 to be utilised therein, as already stated.

As already referred to above, when the signals are tuned exactly, that is, when the tunable circuits are tuned exactly to the middle of the band of frequencies covered by the signals, voltages developed across 54 and 58 are in phase quadrature, so that the "added" and "subtracted" components fed to the differential detector, for example used in unit 55 will be equal. Under this condition the differential rectified output from unit 55, obtained at D will be zero. When, however, signals A and B are frequency modulated, the output voltage developed across 54 is phase modulated as stated above and a differential output will be made available at D said output bearing a direct relation to said frequency modulations at A and B.

If a common automatic gain control arrangement is required with such a system, a suitable arrangement, as for example that shown following C, may be used. Here a connection 61 feeds part of the output voltage developed across coil 51 into a rectifier 62 via an isolating condenser 63 and a rectified voltage suitable for said control and dependent on the strength of the input to said rectifier 62 is made available at 64, the resistances 65, 66 and condenser 67 constituting a simple well known load resistor and low pass filter arrangement for the purpose.

While the principles of the invention have been described above in connection with specific embodiments, and particular modifications thereof, it is to be clearly understood that this description is made only by way of example and not as a limitation on the scope of the invention.

What I claim is:

1. A radio space-diversity receiving system for the reception of angularly modulated waves comprising a plurality of receiving antennae, a plurality of receiving channels each coupled to a separate one of said antennae, two branches coupled in shunt in each channel, an oscillator common to all the channels, means for beating the waves in one branch of each channel with the output of said oscillator to produce a common predetermined beat frequency wave, means for mixing the resultant waves with the waves in said other branch, means for selecting in all the channels an output from said mixing means occupying the same portion of the frequency spectrum means in a given branch of each channel for translating the angular modulation of the signal wave into phase modulation, and means for combining said outputs in a common circuit for detection.

2. A system according to claim 1 further including in a given branch of each channel coupled circuits tuned to the unmodulated frequency of the waves passing therethrough and adapted to produce a phase shift of the waves passing therethrough which varies in accordance with the angular modulation of the waves passing therethrough.

3. A system according to claim 2 further including in a given branch of each channel means for producing a phase shift equal to 90° in the mean frequency of the waves passing therethrough and a shift that differs from 90° according to the angular modulation of the waves passing therethrough.

4. A system according to claim 1 further including in said common circuit for detection means for differential detection of said combined output with reference to the frequency of the oscillator.

References Cited in the file of this patent

UNITED STATES PATENTS

| Number | Name | Date |
|---|---|---|
| 1,941,070 | Bailey | Dec. 26, 1933 |
| 2,219,749 | Oswald | Oct. 29, 1940 |
| 2,448,866 | Crosby | Sept. 7, 1948 |
| 2,510,889 | Hollingsworth | June 6, 1950 |

OTHER REFERENCES

Anderson, "A Floating Beat Note," page 18 in QST, December 1926.